United States Patent
Müller et al.

(10) Patent No.: US 11,151,343 B2
(45) Date of Patent: Oct. 19, 2021

(54) READING OPTICAL CODES

(71) Applicant: SICK AG, Waldkirch (DE)

(72) Inventors: Romain Müller, Waldkirch (DE); Florian Schneider, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 16/700,421

(22) Filed: Dec. 2, 2019

(65) Prior Publication Data

US 2020/0175238 A1 Jun. 4, 2020

(30) Foreign Application Priority Data

Dec. 4, 2018 (EP) .................................... 18209953

(51) Int. Cl.
*G06K 9/80* (2006.01)
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC ............ G06K 9/00771; G06K 9/00671; A61B 34/10; A61B 34/25
USPC ............... 235/462.11, 385, 462.24, 462.41
See application file for complete search history.

(56) References Cited

U.S. PATENT DOCUMENTS

| | | | | |
|---|---|---|---|---|
| 8,644,585 B1 * | 2/2014 | Mennie | ............ | G07D 11/30 382/135 |
| 9,767,571 B2 * | 9/2017 | Lee | ............ | G06T 7/246 |
| 10,215,865 B2 * | 2/2019 | Gubbens | ............ | H01J 37/244 |
| 10,768,698 B1 * | 9/2020 | Lee | ............ | G06K 9/2027 |
| 10,769,909 B1 * | 9/2020 | Modestine | ............ | G08B 13/19656 |
| 2013/0335595 A1 | 12/2013 | Lee et al. | | |
| 2020/0094288 A1 * | 3/2020 | Coupar | ............ | B65G 43/08 |

FOREIGN PATENT DOCUMENTS

| | | |
|---|---|---|
| EP | 1645839 B1 | 8/2007 |
| EP | 2026033 B1 | 6/2009 |
| EP | 2838069 B1 | 12/2017 |
| WO | 2015/036592 A1 | 3/2015 |
| WO | 2017/174579 A1 | 10/2017 |
| WO | 2018/073379 A1 | 4/2018 |

OTHER PUBLICATIONS

Search Report dated May 23, 2019 issued in corresponding European Application No. 18209953.1.
White Paper by Prophesee, www.prophesee.ai.
Gallego, et al., "A Unifying Contrast Maximization Framework for Event Cameras, with Applications to Motion, Depth, and Optical Flow Estimation", IEEE Conference on Computer Vision and Pattern Recognition (CVPR), vol. 1, Salt Lake City, 2018.
Delbruckl, "Neuromorophic Vision Sensing and Processing", ESSCIRC Conference 2016: 42nd European Solid-State Circuits Conference, IEEE, Sep. 12, 2016.

* cited by examiner

*Primary Examiner* — Daniel St Cyr
(74) *Attorney, Agent, or Firm* — Nath, Goldberg and Meyer; Jerald L. Meyer

(57) ABSTRACT

A method of reading optical codes is specified in which an image sensor having at least one pixel element detects image information in a reading zone and in which the image information is evaluated to read a code in the reading zone. The image sensor is an event-based image sensor here.

20 Claims, 6 Drawing Sheets

READING OPTICAL CODES

The invention relates to a method of reading optical codes and to a corresponding camera-based code reader.

Optical codes are widespread to provide an object with information and to read it again at a later point in time. Code readers are known from supermarket checkouts, for automatic parcel identification, for sorting mail shipments, from baggage handling at airports, and from other logistics applications.

In a code scanner, a reading beam is guided transversely over the code by means of a rotating mirror or by means of a polygon mirror wheel and brightness differences or intensity differences are acquired by this scan by means of a detector and the code information is acquired therefrom. A camera-based code reader takes images of the objects having the codes located thereon using an image sensor and image evaluation software extracts the code information from these images. A matrix camera directly generates a two-dimensional image, while a line scan camera detects a moving object line for line and thus likewise gradually composes a two-dimensional image. The image is then segmented to decide whether a code is recognizable in the image and in this case the code is read. A code scanner has a greater depth of field, but in turn also only reads one-dimensional codes or barcodes. Camera-based code readers also easily manage two-dimensional kinds of codes, but the segmentation and image evaluation that are time critical in dependence on the application require some effort so that code scanners continue to have their areas of use.

In an important application group, the objects bearing code are conveyed past the code reader. A code scanner here detects the respective codes successively conducted into its reading zone. As a rule, images are recorded using a two-dimensional image sensor that overlap more or less depending on the recording frequency and on the conveying speed. Such a relative movement is actually a requirement for a two-dimensional image being produced at all for a line scan camera. So that the objects can be arranged in any desired orientation on the conveyor, a plurality of code readers are often provided at a reading tunnel to record objects from a plurality of sides or from all sides.

EP 1 645 839 B1 discloses a detection of objects moving through the visual field of an optical sensor. Distances from the objects are determined here using a range finder and regions of interest having optical codes are selected. EP 2 026 033 B1 improves the data transmission of the regions of interest. The actual code reading is, however, not discussed in any great detail in these two documents.

Much more recently, an innovative camera technique has arisen, the so-called event-based camera. However, it has to date not been brought into any relation with the reading of optical codes. A conventional camera exposes all of its pixels at a regular frame repetition rate and then simultaneously reads them in order thus to acquire a number of stationary two-dimensional images per observed timer period corresponding to the frame repetition rate.

There is likewise a matrix of pixels in an event-based camera, but neither a fixed frame repetition rate nor a common reading of pixels. Instead, each pixel individually checks whether it determines a change in intensity. Image information is only output or read in this case, and indeed only by this pixel. Each pixel is thus a kind of independent motion detector. A detected movement is individually reported as an event. The event-based camera thereby reacts extremely quickly to the dynamics in the scene. The image data cannot be grasped as intuitively by the human eye in this form because the static image portions are missing; however, they can provide advantages in machine evaluations.

An event-based camera is, for example, described in a white paper by Prophesee that can be downloaded from their internet site.

Respective pixel circuits for an event-based camera are known from WO 2015/036592 A1, WO 2017/174579 A1 and WO 2018/073379 A1.

The paper by Gallego, Guillermo, Henri Rebecq, and Davide Scaramuzza, "A unifying contrast maximization framework for event cameras, with applications to motion, depth, and optical flow estimation", IEEE Int. Conf. Comput. Vis. Pattern Recog. (CVPR), Vol. 1. 2018 presents methods on how motion, distances, and optical flow can be determined from the data of an event-based camera.

US 2013/0335595 A1 discloses an apparatus and a method for event-based image processing, specifically on determining the optical flow that is not of particular importance in connection with the reading of codes.

It is therefore the object of the invention to improve code reading with a camera.

This object is satisfied by a method of reading of optical codes and by a corresponding camera-based code reader in accordance with the respective independent claim. Image information is detected by an image sensor here. The image sensor comprises at least one pixel element, preferably a line or a matrix of a number of pixel elements. The image information is evaluated to read a code located in the reading zone and recorded by the image sensor.

The invention starts from the basic idea of reading codes using an event-based image sensor. An event-based camera is thus used instead of a conventional camera. The event-based detection of image information enables an alternative evaluation of optical codes.

The invention has the advantage that a multiple scanning of the image information takes place at a high repetition rate. Furthermore, only those zones are read and thus taken note of in which there is an intensity change. Redundant data such as a static background are not recorded at all. An event-based image sensor also enables a high dynamic range in addition to the very fast pixel trigger rate. The event-based image sensor is practically insensitive with respect to the cw light portion of the background since it does not cause any intensity change and therefore does not trigger an event.

The pixel element preferably determines when the intensity detected by the pixel element changes and delivers image information on an event basis at exactly this time. The special behavior of the pixel elements of an event-based camera have already been explained in the introduction which is again referenced here. The pixel element checks whether the detected intensity changes. Only that is an event and image information is only output or read on an event. A type of hysteresis is conceivable in which the pixel element still ignores a defined change of the intensity that is still too small and does not consider it an event.

The pixel element preferably delivers differential information as to whether the intensity has decreased or increased as the image information. The information read out of the pixel element is therefore, for example, a sign +1 or −1 depending on the direction of change of the intensity. A threshold for intensity changes can be set here up to which the pixel element still does not trigger an event. In a subsequent internal representation for a further evaluation, the value 0 can be added for times at which no event had been detected.

The pixel element preferably delivers an integrated intensity as the image information in a time window determined by a change of the intensity. The information is here not restricted to a direction of the change of intensity, but the incident light is integrated in a time window fixed by the event and a gray value is thereby determined. The measured value thus corresponds to that of a conventional camera, but the point in time of the detection remains event-based and coupled to a change of intensity.

The pixel information provides image information having an update frequency of at least one KHz or even at least ten KHz. The update frequency of a conventional camera is the frame repetition rate or frame rate. Such a common frame repetition rate is unknown to the event-based camera since the pixel elements output or refresh their image information individually and on an event basis. However, the response times are here extremely short and would only be achieved with a conventional camera at huge costs with a thousand or more images per second; with an update frequency of ten KHz or even of several tens of KHz still possible with an event-based camera, this would no longer be reproducible technically with a conventional camera.

This high temporal resolution also has the advantage that there is practically no motion blur. An object does not move onward by a multiple pf pixels within one of the extremely short update periods that corresponds to a conventional exposure time and also no blurred image is thus recorded.

The image sensor preferably produces a data flow as the image information from events that each have coordinate information of the associated pixel element, a piece of time information, and a piece of intensity information. A conventional data stream comprises the intensity values or gray values of the pixels and the spatial reference in the image sensor plane is produced in that all the pixels are read in an ordered sequence. In the event-based image sensor, data tuples per event are instead preferably output that make the event associable. The location of the associated pixel element, the direction ±1 of the intensity change, and/or the intensity measured at the event, and a time stamp are determined.

The data stream is preferably converted by filling with zeroes into a matrix whose basis is formed by the arrangement of the pixel elements on the image sensor and by the time. A usual matrix representation is frequently more suitable for the further processing and consists of a sequence of single frames consecutive in time, i.e. of layers strung together in time of the intensity distribution over the pixel elements of the image sensor respectively recorded at a fixed point in time. With a matrix sensor, these layers are 2D matrices; with a line scan sensor, 1D matrices, and with a simple light receiver, only a dot. A 3D matrix, a 2D matrix, or a 1D matrix is produced using the time perpendicular thereto. The granulation of the direction of time would conventionally be preset by the frame rate; it can be fixed with a lot more fineness with an event-based camera. A sparse matrix is ultimately produced by the events; the data stream from the event-based image sensor corresponds to a representation saving memory and bandwidth.

The image sensor is preferably located in a relative motion with respect to the code. This relative motion is produced in a number of code reading applications by a conveying device on which the code-bearing objects are conveyed through the reading zone of the code reader installed as stationary. Alternatively, the camera is moved over the code. The can be done by a movement of the whole camera, but also by an internal panning mechanism or scanning mechanism of the camera. A two-dimensional image can thus be detected using a line and a line can be detected using a single pixel, in a similar manner to a code scanner. The relative motion is preferably linear and uniform.

Image information of the same object structures detected at different times is preferably identified. Each moving object structure, in particular an edge, is registered as an event in other pixel elements at different times because it moves relative to the pixels. In a matrix representation, the object structures are found at different points in the different layers, displaced in accordance with the relative motion. On a linear motion, obliquely extending lines or planes of edges or corners of the object structures are produced. They will later also be called space-time continuums.

The code information of the code is preferably determined from the geometries of the object structures, in particular their widths and mutual distances. In a code zone, the intensity changes registered in the events are caused by code structures moving in the reading zone and their geometry includes the sought code information. Strictly speaking, this information is even redundantly detected and is positioned multiple times in the space-time continuums. With a barcode and a linear, uniform relative motion, for example, the space-time continuums are planes that are in parallel with one another and from whose thicknesses or mutual distances the line widths and thus the code information can be directly read. This is also similar with 2D codes, but only no parallel plane group is produced there, but rather part sections of planes also at an angle to one another in accordance with the specifications of the 2D code standard.

The identification of the same object structures preferably takes place by reconstructing the relative motion. The displacement of the object structures at different times is determined by the relative motion. The relative motion can thus be used to relocate the object structures, just like conversely the relative motion can be estimated from the object structures identified together. In use at a conveying device, its motion is anyway typically measured by a suitable sensor such as an encoder or is predefined by a conveyor control that can provide the respective speed.

Image information detected at different points in time is preferably correlated. This is a possibility of relocating object structures in image information detected at different points in time. The correlated zones, however, do not have to correspond to any specific object structure; any desired image zones can be correlated, for instance some rows, columns, or parts thereof. The correlation also delivers a time reference that can be used as an estimate therefor instead of a measured relative motion.

A degree of contrast of the image information is preferably optimized. This is again an alternative possibility of associating object structures with one another that were recorded at different times. On observation of a matrix representation of the image information, a superposition of the matching object structures results from a specific angle if view. This angle of view is aligned along the relative motion so that, as already addressed, the relative motion can alternatively be measured or can be estimated by correlation. However, as long as the angle of view is not correct, the contrast is also blurred. This is an illustrative description of why a contrast optimization represents a further possibility of at least implicitly locating and utilizing the information on the relative motion.

A projection of the matrix is preferably generated in accordance with the relative motion while assuming a linear relative motion. This is illustratively exactly the observation of the matrix representation of the image information from the suitable angle of view at which the same object structures detected at different times are behind one another. The projection therefore collects all the events that were detected at one point of an object structure and code information can be particularly reliably read therefrom.

The presence of a code in the reading zone is preferably recognized with reference to the time behavior of the events generated by the image sensor. This is a precursor to the code reading in which it is first recognized whether a code is present in the reading zone at all. This is conventionally the task of the segmentation that can, however, be dispensed with in accordance with the invention or can be replaced with the event-based image recording. A code in the reading zone generates events having a specific time behavior. This is particularly comprehensible with a barcode having a known module size in a uniform linear motion; events are then namely to be expected in a cumulative manner from such a code at a specific fixed frequency that can be calculated in advance from the module size and from the relative motion. Different types of code and different movements also result in prominent patterns that are algorithmically predictable or at least recognizable by classifiers or by machine teaching.

Codes are preferably read having a module width smaller than the pixel size of the pixel element. If a code module is only moved in or out of the detection zone of a pixel element partially, in particular by half, it is nevertheless an intensity change that is registered. An even-based image sensor therefore even allows a subpixel resolution; in the case of a reliable recognition of a pixel element impacted by half a code module, a resolution doubled with respect to the physical resolution in both directions.

The image sensor is preferably effectively set at a slant to a plane of the code. This has the result that the lines of the image sensor have a difference distance from the plane, for example the plane of a conveying device or a plane in parallel therewith corresponding to the top surfaces of the conveyed objects, and the object structures thus enter into the depth of field range or at least come closer to it at least for some lines. Due to the relative motion, an object structure is recorded multiple times in different lines so that at least some events are recorded with a better focus. The slanting is possible by a physical slanting of the camera, but also by an optics such as an optical wedge.

Image information of the reading zone is preferably additionally detected using a non-event based image sensor. The event-based camera is therefore combined with a conventional camera. It is conceivable here that both systems work independently of one another and that the reading results are subsequently compared or supplemented. A fusion that is followed by a reading attempt with improved chances of a decoding can, however, already take place on the plane of the image information.

A trigger point in time and/or a parameter for the non-event based image sensor is/are preferably determined from the image information of the event-based image sensor. The event-based camera serves as a trigger sensor for the conventional camera in an embodiment. It has already been explained above that the event-based camera can recognize with reference to the time behavior of the events that a code is located in the reading zone and this information particularly preferably serves as a trigger for the conventional camera or for the assembly of both cameras. The event-based camera can, however, also detect advance information, in particular on the relative motion and can thus predefine camera sensors such as the exposure time, a region of interest, zoom parameters therefor, or parameters of the decoder such as a module size.

The object set above is additionally satisfied by a code reader having an event-based image sensor with at least one pixel element for detecting image information in a reading zone and with an evaluation unit in which a method in accordance with the invention for reading optical codes is implemented. Depending on the embodiment, the evaluation unit is part of a camera of the event-based image sensor or of a device connected thereto such as a higher ranking control or another processor or it is distributed over the camera and/or a plurality of such devices, in particular also within a network or a cloud.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

BRIEF DESCRIPTION OF THE DRAWINGS

FIG. 1 shows an optoelectronic code reader 10 which is mounted above a conveyor belt 12 which conveys objects 14 through the reading zone 18 of the code reader 10, as indicated by the arrow 16. The objects 14 bear code zones 20 on their outer surfaces which are detected and evaluated by the code reader 10. These code zones 20 can only be recognized by the code reader 10 when they are affixed to the upper side or at least in a manner visible from above. Differing from the representation in FIG. 1, a plurality of code readers 10 can be installed from different directions for the reading of a code 22 affixed somewhat to the side or to the bottom in order to permit a so-called omnireading from all directions. The arrangement of the plurality of code readers 10 to form a reading system mostly takes place as a reading tunnel in practice. This stationary use of the code reader 10 at a conveyor belt is very common in practice. However, the invention first relates to the code reader 10 itself and to its code reading method so that this application example may not be understood as restrictive.

Figure 1:
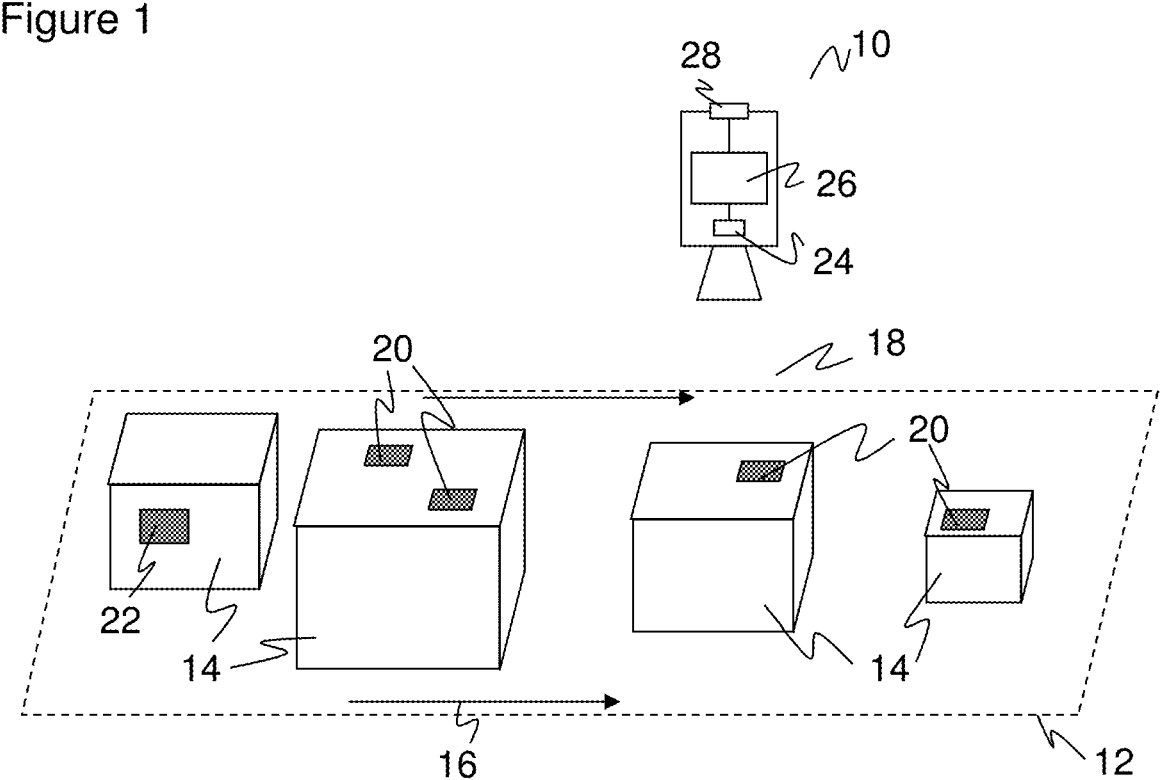
FIG. 1 a three-dimensional representation of a camera-based code reader above a conveyor belt having code-bearing objects.

The code reader 10 detects image information of the conveyed objects 14 and of the code zones 20 by an image sensor 24. This image sensor 24 is an event-based image sensor and the special features of an event-based image sensor and of the evaluation of its image information for code reading will be explained in more detail further below with reference to FIGS. 2 to 11. Event-based cameras require dynamics in the recorded scene as otherwise no events are registered. Assembly line applications are therefore a suitable application since a movement of the objects 14 and code zones 20 to be recorded is ensured.

The optical detection principle using the image sensor 24 is not fixed to any particular geometry or any specific camera design. The image sensor 24 as a rule comprises a matrix arrangement or linear arrangement of pixel elements and detects a two-dimensional reading zone 18 at once or successively by assembling image information in the course of the movement of the objects 14 on the conveyor belt 12. It is also conceivable to combine an image sensor 24 having only one pixel element or having a linear arrangement of pixel elements with a scanning mechanism and thus to effectively detect a line or an area.

The main object of the code reader 10 is to recognize the code zones 20 and to read the codes affixed there. An evaluation unit 26 is connected to the image sensor 24 for this purpose and reads its image information and further processes it by means of image evaluation and by means of decoding processes. Depending on the embodiment of the code reader 10, the evaluation unit 26 can deal with barcodes and/or with various 2D codes. The code reader 10 outputs information such as read codes or image information via an interface 28. The function of the evaluation unit 26 can also be at least partially provided externally while utilizing the interface 28, for instance by connection to a higher ranking control, to a network, or to a cloud.

Figure 2:
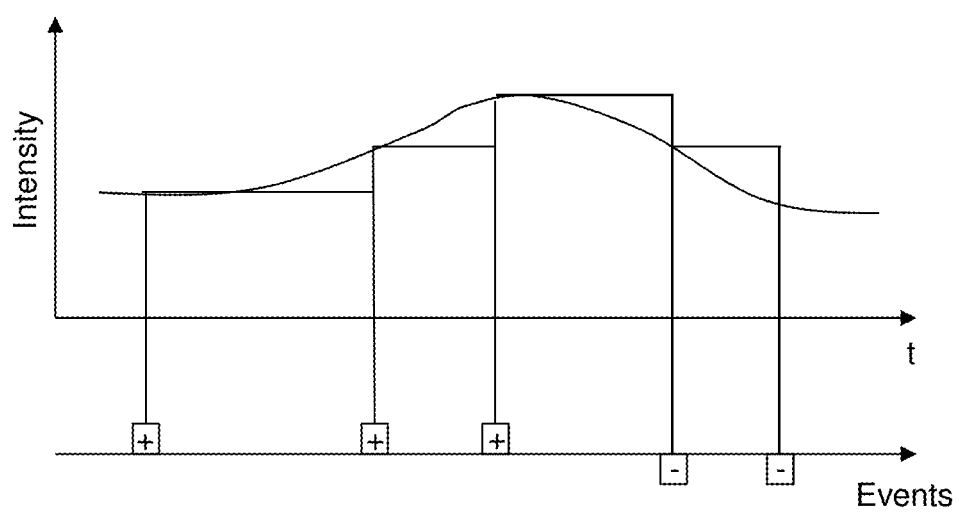
FIG. 2 an exemplary intensity distribution of a pixel for explaining an event-based detection of image information.

FIG. 2 shows in the upper part for the explanation of the functional principle of the event-based image sensor 24 a purely exemplary temporal intensity development in a pixel element of the image sensor 24. A conventional image sensor would integrate this intensity development over a predefined exposure time window; the integrated values of all the pixel elements would be output in the cycle of a predefined frame rate and then reset for the next frame.

The pixel element of the event-based image sensor 24 instead reacts to an intensity change individually and independently of a frame rate. Points in time at which an intensity change was found are respectively marked by perpendicular lines. Events at these points in time are shown in the lower part of FIG. 2 with plus and minus in dependence on the direction of the intensity change. It is conceivable that the pixel element does not react to any and all intensity changes, but only when a certain threshold has been exceeded. The pixel element is read in an event-based manner at those points in time at which an intensity change has been recognized and then outputs the sign. The image information can subsequently still be supplemented by the value zero at those times at which there was no event so that an image arises over all the pixel elements of the image sensor 24. This image, unlike as is usual with conventional images, only indicates the moving edges, either object contours, shadows, or prints.

There are also integrating event-based cameras in addition to such differential event-based cameras. They react in a very analogous manner to intensity changes. Instead of outputting the direction of the intensity change, however, the incident light is integrated in a time window predefined by the event. A gray value is thereby produced. Differential and integrating event-based cameras have a different hardware design and the differential event-based camera is faster since it does not require any integration time window. The further examples in this description relate to a differential event-based camera, but the invention is not restricted thereto. The technology of an event-based camera is anyway not a subject matter, but rather a requirement of the invention and reference is additionally made to the patent literature and scientific literature named in the introduction.

Figure 3:
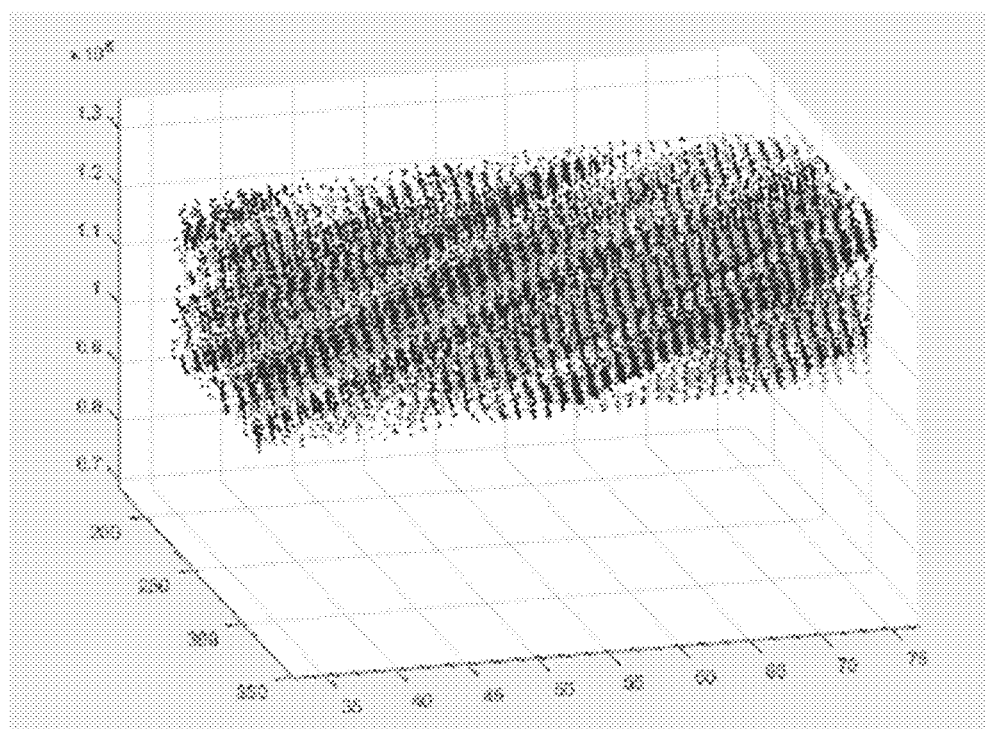
FIG. 3 a three-dimensional representation of the image information delivered by an event-based image sensor during a movement of an optical code.

FIG. 3 shows a possible representation of the image information delivered by the event-based image sensor 24. The example was recorded by a code reader 10 having a matrix-shaped event-based image sensor 24 through whose reading zone 18 an optical code is moved linearly and uniformly as is the case in a typical application on a conveyor belt 12.

A sparse three-dimensional data record is produced by the event-based detection of image information since unlike with a conventional camera every pixel element does not deliver image information for a fixed time, but only those that that register an event in the form of an intensity change. Two dimensions of the data record correspond to the pixel arrangement on the image sensor 24; the third dimension is time, preferably with extremely high temporal resolution in the range of at most a few microseconds or even lower. The values stored in the matrix are the signs of the intensity change with a differential event-based image sensor 24 and are the gray values with an integrating event-based image sensor 24, in each case optionally filled with zeros at all positions without an event. With a linear or dot-like pixel arrangement of the event-based image sensor 24, the dimensions are reduced accordingly.

In FIG. 3, the point cloud of a differential event-based image sensor 24 is now shown in an image section (200, 35), (350, 75), where the two signs are distinguished by different gray encoding. There are recognizable structures that track from the bottom left to the top right. These structures are also called space-time continuums and are produced by the linear movement of the recorded code.

An edge in the reading zone 18 initially triggers an event at a point in time t1 on reaching a pixel (x1, y1), again at a later point in time t2 at a pixel (x2, y2), and the pixel coordinates (x1, y1), (x2, y2) and the points in time t1, t2 are related to one another via the linear motion. The edge consequently produces a line or a plane in the point cloud shown since the edge as a rule simultaneously falls on a plurality of pixels.

The recorded image information can be detected very well in a summary manner if the point cloud is projected, viewed from a direction of gaze or along this direction of gaze that corresponds to the linear movement and thus to the gradient of the space-time-continuums. Events are thereby namely summarized that originate from the same real object structure in the reading zone 18.

Figure 4:
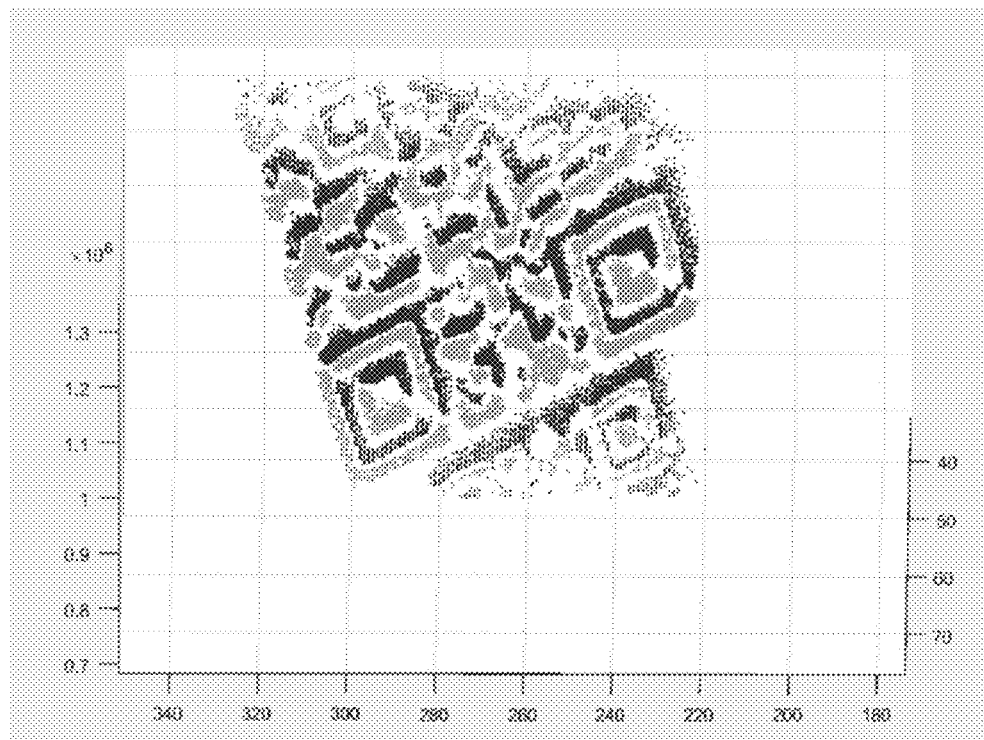
FIG. 4 a plan view of the image information shown in FIG. 3 along the direction of movement.

FIG. 4 shows a corresponding slanted plan view in this direction of gaze and the code structures can then be easily recognized therein with the naked eye and are thus naturally also accessible to image processing. The power of the event-based image sensor 24 is also recognizable: The event is sampled with only one bit or, if the zero is added, with two bits. The edge is, however, detected at an extremely high repetition rate of N pixels along the direction of movement so that a very good result can be deduced.

Figure 5:
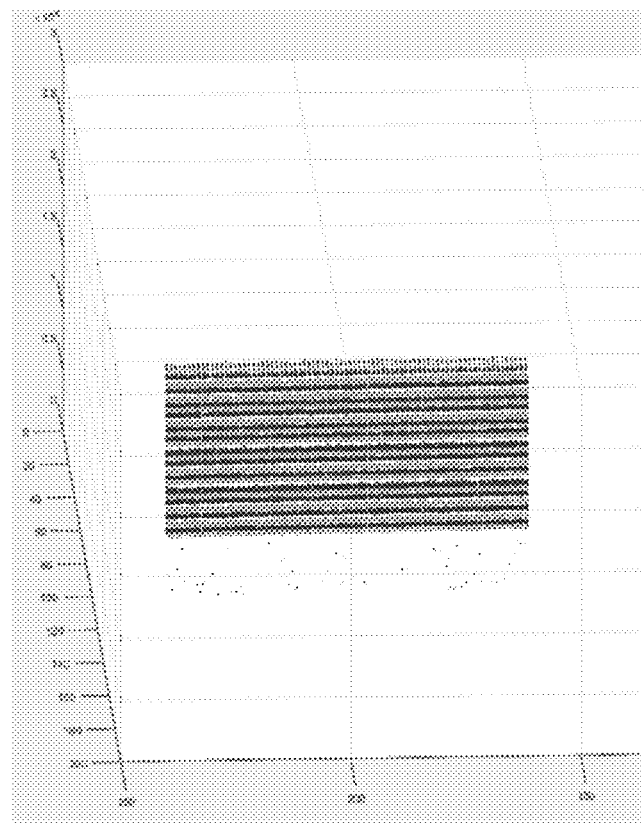
FIG. 5 a three-dimensional view of image information recorded using an event-based image sensor similar to FIG. 3 for a barcode.
Figure 6:
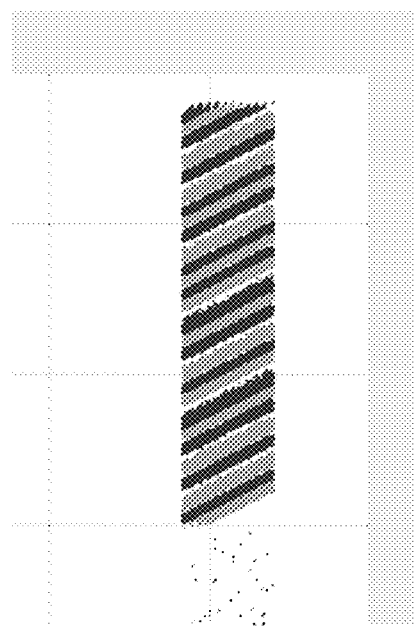
FIG. 6 a side view of the image information in accordance with FIG. 5.

The code reading with the event-based image sensor 24 will now be explained in even more detail with reference to the example of a barcode. These evaluations preferably take place in real time or at least almost in real time. FIG. 5 first shows the point cloud in a three-dimensional view similar to FIG. 3, but already from the angle of view along the movement and thus along the space-time continuums. FIG. 6 shows an associated side view.

The gradient of the space-time continuums corresponds, with the exception of constants, to the movement speed of the conveyor belt 12. This movement speed can be measured, for example using an encoder at the conveyor belt 12, or it is transferred from a control of the conveyor belt 12. The recorded image information, however, also itself includes the speed information so that an additional sensor is not necessarily required for this purpose and conversely the speed can even be determined as a further output value. At least a change of the motion behavior of the conveyor belt 12 can be detected instead of a quantitative output of the speed.

A conceivable evaluation of this kind is based on correlation. An object contour is detected by the event-based image sensor 24 multiple times in different pixel elements in the course of the movement of the conveyor belt 12. These object contours can be recognized by correlation, for example in different lines. The time difference between the repeated detections of the same object contour is a measure for the speed of the movement. To obtain absolute speed information, however, it still has to be offset against the camera optics and the geometry of the detected object. This is not necessary for the code reading; it is sufficient to know the gradient of the space-time continuum in the units of the point cloud.

Figure 7:
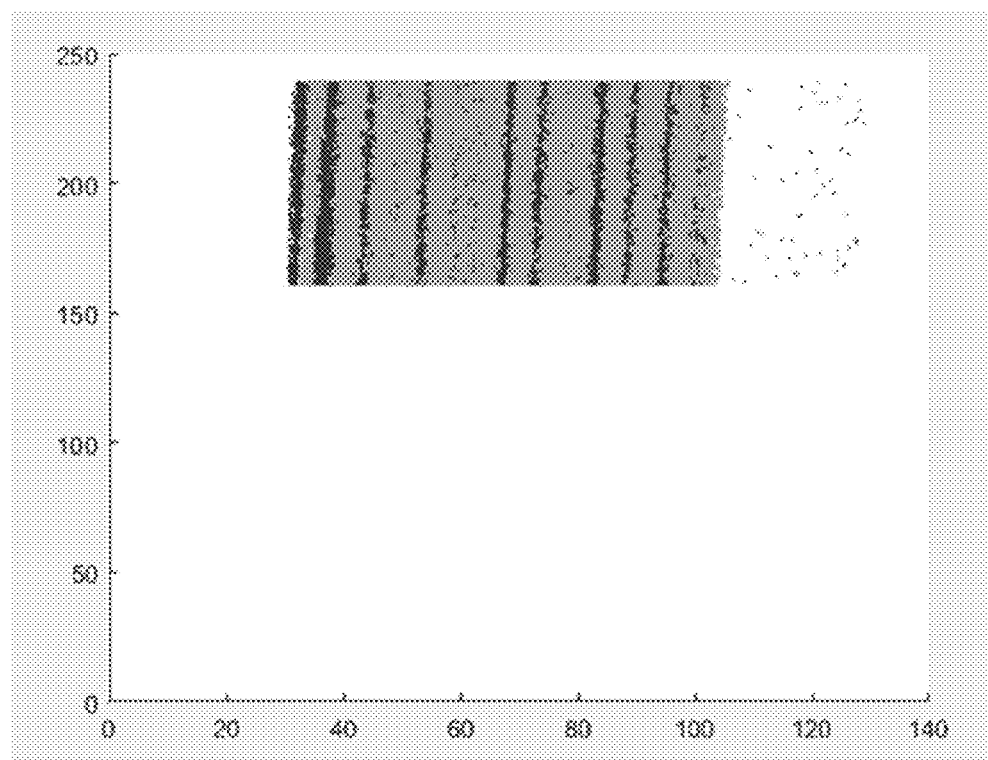
FIG. 7 a plan view of the image information of a barcode recorded using an event-based image sensor along a direction of movement still not correctly estimated with a low contrast.
Figure 8:
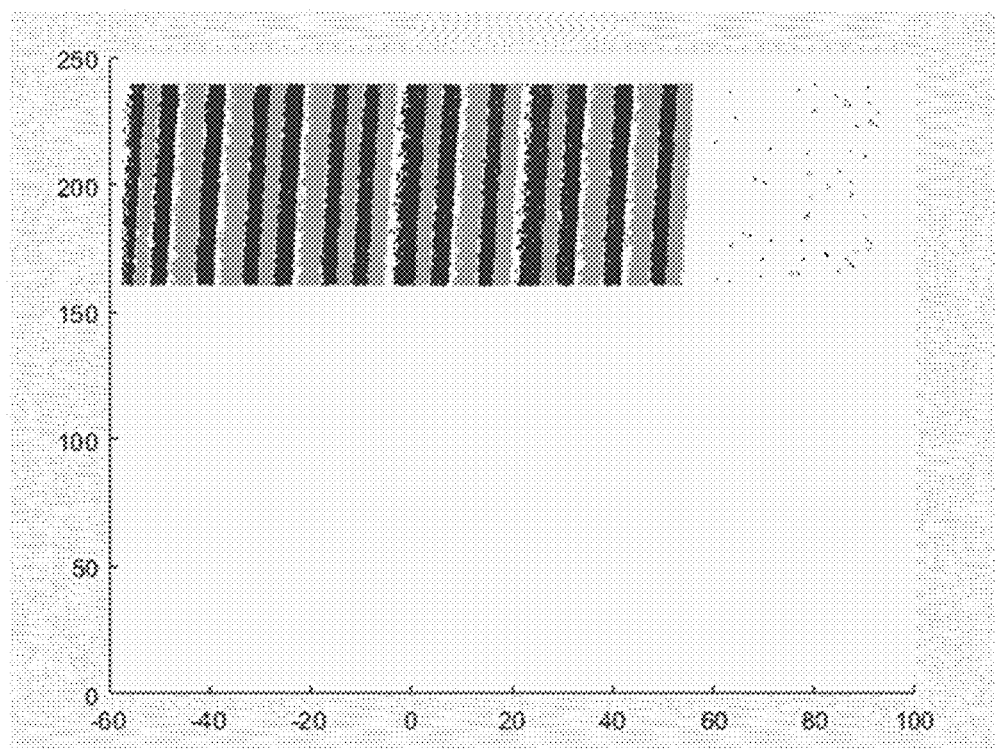
FIG. 8 a plan view as in FIG. 7, but now with an optimized contrast and a correctly estimated direction of movement.

A degree of contrast can also be optimized instead of a correlation. This is illustrated in FIGS. 7 and 8. FIG. 7 shows a plan view of a point cloud or its projection with a non-optimal direction that therefore does not correspond to the gradient of the space-time continuums and thus to the movement of the conveyor belt 12. The code structures appear faded; the contrast is not optimum. In contrast, FIG. 8 shows a corresponding plan view with optimized contrast and a matching gradient. Two exemplary possibilities of contrast optimization are a gradient descent approach with optimization of a suitable measure such as the total contrast, a local standard deviation, or proximity relationships, or a method analogous to the article by Gallego et al. named in the introduction in which the gradient is determined instead of angles.

With a known gradient of the space-time continuums, either by measuring the movement of the conveyor belt 12, by assumptions or by information on its control, or by a separate evaluation by means of correlation, contrast optimization, or other methods, the point cloud is projected onto a two-dimensional surface and thus compressed. The corresponding representations in FIGS. 4, 5, and 8, but also the side view of FIG. 6, allow a recognition that the image information is now accessible to a decoding of the code information. For example, the relative distance of the space-time continuums resulting as planes is determined to determine the widths of the code modules of a barcode and thus its content.

The structuring of the point cloud by means of the space-time continuums additionally allows it to be recognized whether a code zone has been detected at all without the images being segmented or evaluated in a more in-depth manner. The time sequence of the events of some pixel elements is analyzed for this purpose, for example, for instance in one line or in a plurality of lines, preferably where an object 14 is first detected in accordance with the movement of the conveyor belt 12. Depending on the module size of a barcode and on the speed of the conveyor belt 12, events occur at a specific frequency and this is a clear indication that a barcode has now entered the reading zone 18. The behavior is not fully as clear with 2D codes, but also shows significant patterns with respect to other objects and the time behavior can therefore likewise be distinguished, for instance by teaching, in particular with machine teaching.

The code reader 10 is thus also able to trigger directly on a detection of code zones. Other image information is therefore not evaluated in more depth at all, for example a decoder is only activated and a reading attempt is thus only started when a code 20 was recognized with reference to the time behavior of the events.

If, conversely, the speed or the gradient of the space-time continuums is known or determined, the module size of the detected codes can also be determined with respect to the determined signal frequencies, which is a helpful parameter for the decoder.

Figure 9A:
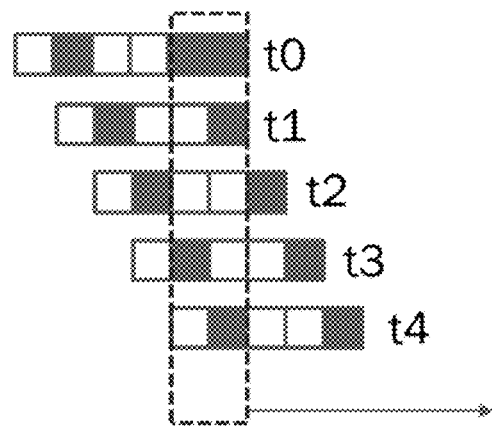
FIG. 9a sections of some modules of a barcode recorded using an event-based image sensor to explain a subpixel resolution.
Figure 9B:
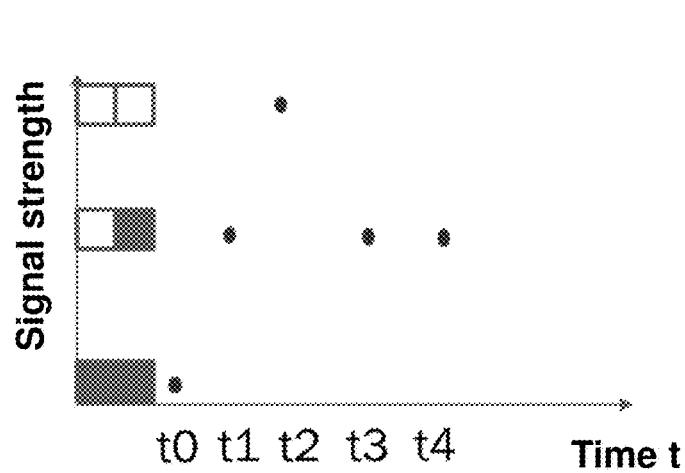
FIG. 9b an intensity change resulting from FIG. 9a and the events triggered thereby.

FIGS. 9a-b illustrates that a subpixel resolution is also possible using an event-based image sensor 24, that is module sizes smaller than a pixel can also be detected, for example 0.5 pixels. FIG. 9a shows the movement of a code structure through the detection zone of a pixel element indicated by a rectangle for different times t0 to t4. The pixel element has an extent that is here, purely by way of example, twice the size of the smallest code structure. The intensity nevertheless also changes when, for example as from time t0 to time t1, a dark code structure is no longer fully detected or is only half detected. This therefore also triggers an event.

The distinction in the subpixel range is shown in FIG. 9b for the times t0 to t4; here for the case of an integrating event-based camera, but a differential event-based camera also distinguishes these events in an analog manner. In contrast to conventional procedures at superresolution of using a plurality of different images to resolve module sizes finer than the pixel extent, this is done intrinsically with an event-based image sensor 24 using the space-time continuums detected thereby.

Figure 10:
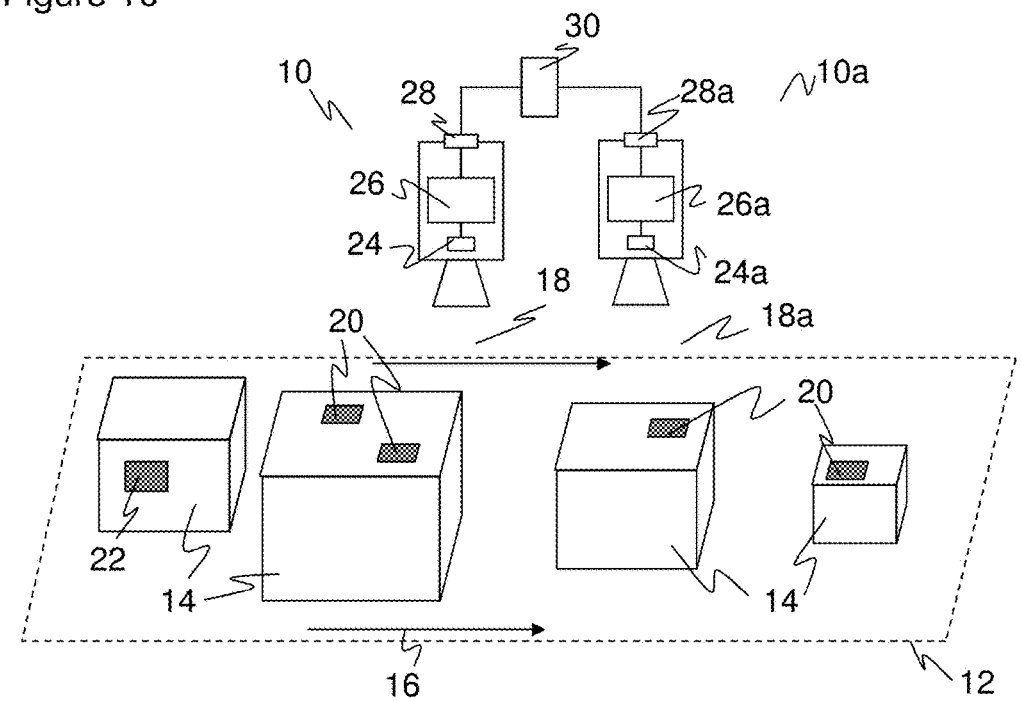
FIG. 10 a three-dimensional representation similar to FIG. 1, but now with an assembly of a conventional camera and an event-based camera for code reading.

FIG. 10 shows a further embodiment of a code reader 10 that is now combined with a conventional code reader 10a. The conventional code reader 10a in the representation has, for reasons of simplicity and purely by way of example, the same design having a reading zone 18a, an image sensor 24a, an evaluation unit 26a, and in interface 28a. The image sensor 24a is, however, not an event-based image sensor although naturally multiple arrangements of code readers 10 in accordance with the invention would be conceivable. The two code readers 10, 10a are connected to one another directly or via a control 30. A simple possibility of cooperation comprises both code readers 10, 10a attempting to read codes and the reading results subsequently being compared.

It is known with an already addressed encoder, alternatively by a speed determination of the code reader 10, where the objects 14 are located at any point in time so that the image information detected by the code readers 10, 10*a* can be brought into agreement. In conventional arrangements of this kind, the code reader 10*a* does not know when an object 14 is to be detected. Images are therefore constantly recorded and presegmented. There is the possibility of using a so-called trigger sensor in the form of a light barrier, a light grid, or a laser scanner to trigger image recordings on an entry of an object into the reading zone. However, this also only recognizes objects as such, but not the actually relevant code zones.

The code reader 10 can now take over the work of this trigger sensor. As described above, a conclusion on when a code zone has been detected can be drawn from the time behavior of the events so that such a trigger sensor is substantially more selective. Indications at the code reader 10*a* on where the code zone is located within the reading zones 18, 18*a* are also possible. The higher apparatus effort, also with respect to a light barrier, is justified by this selectivity, particularly when the code reader 10 simultaneously satisfies a speed measurement or another further task. Parameters of the code reader 10*a*, for instance a setting of the exposure time, can also be optimized using information on the gradient of the space-time continuums to avoid problems with motion blur. The decoder of the code reader 10*a* can also be ideally set or a zoom object can be used to zoom into the code zone by information of the code reader 10 on the module size.

Figure 11A:
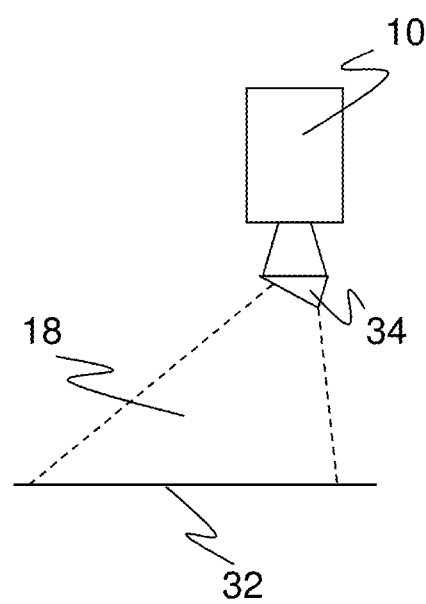
FIG. 11a an effective slanting of the event-based code-reading camera with respect to the reading zone with the aid of an optical wedge.
Figure 11B:
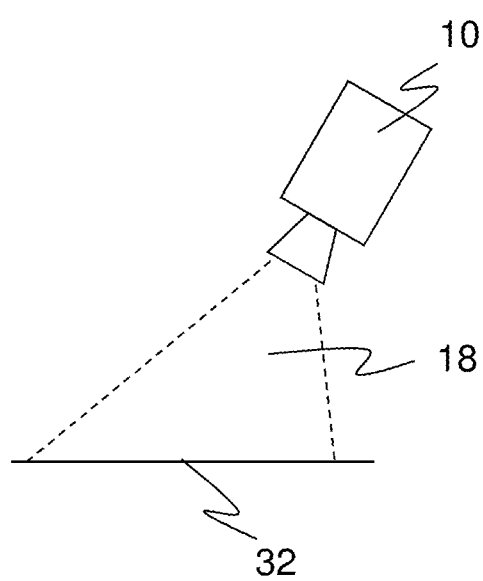
FIG. 11b an actual slanting of the event-based code-reading camera.

FIGS. 11*a*-*b* illustrate a possibility of ensuring sufficient focus by slanting the code reader 10 with respect to a detection plane 32, in particular the plane of the conveyor belt 12. In this respect, an optical wedge 34, generally a corresponding optics, is used in FIG. 11*a* and the code reader 10 is actually installed at a slant in FIG. 11*b*. The slanting, irrespectively of whether effectively as in FIG. 11*a* or actually as n FIG. 11*b*, has the result that the lines of the pixel elements of the event-based image sensor 24 have light paths of different lengths from the recorded object structures, A code 20 therefore passes through a larger focal range overall on its movement through the reading zone 18 so that a detection over a larger depth of field range is effectively achieved even without an autofocus.

An event-based camera is more sensitive to vibrations than a conventional camera since it reacts to changes of the light intensity. Where this cannot be avoided by a protected installation, it is conceivable that the code reader 10 itself recognizes such vibrations and compensates them algorithmically. In contrast, an event-based camera is even considerably more robust with respect to extraneous light since it practically does not react at all to cw light. Events are triggered in the event of a pulsed interference light source. Such disrupters can be algorithmically recognized and filtered. Alternatively, the preferably provided separate illumination of the code reader 10 is configured with a very narrow band and an optical filter matched to this illumination is arranged in front of the event-based image sensor 24.

The invention claimed is:

1. A method of reading optical codes in which an image sensor having at least one pixel element detects image information in a reading zone and in which the image information is evaluated to read a barcode or 2D code in the reading zone,
    wherein the image sensor is an event-based image sensor provided as an event-based camera whose pixel elements determine when the intensity detected by the pixel element changes, responsive to the pixel element changes to provide image information,
    wherein the pixel element determines when the intensity detected by the pixel element changes and delivers image information at the exact time when the pixel element changes,
    and wherein the pixel element delivers differential information on whether the intensity has decreased or increased as the image information.

2. The method in accordance with claim 1,
    wherein the pixel element determines when the intensity detected by the pixel element changes and delivers image information in an event-based manner at exactly this time.

3. The method in accordance with claim 2,
    wherein the pixel element delivers differential information on whether the intensity has decreased or increased as the image information to indicate a threshold for intensity change triggers an event.

4. The method in accordance with claim 2,
    wherein the pixel element delivers an integrated intensity in a time window determined by a change of the intensity.

5. The method in accordance with claim 1,
    wherein the pixel element provides information having an update frequency of at least one KHz or even at least ten KHz.

6. The method in accordance with claim 1,
    wherein the image sensor generates a data stream of events as the image information that respectively have coordinate information of the associated pixel element, time information, and intensity information.

7. The method in accordance with claim 1,
    wherein the image sensor is in a relative motion with the code.

8. The method in accordance with claim 1,
    wherein image information of the same object structures detected at different points in time is identified.

9. The method in accordance with claim 8,
    wherein image information of the same object structures detected at different points in time is identified by reconstructing the relative motion.

10. The method in accordance with claim 8,
    wherein the code information of the code is determined from the geometries of the object structures.

11. The method in accordance with claim 10,
    wherein the geometries of the object structures comprise widths and mutual distances.

12. The method in accordance with claim 1,
    wherein image information detected at different points in time is correlated; and/or
    wherein a contrast degree of the image information is optimized.

13. The method in accordance with claim 1,
    wherein a projection of the matrix corresponding to the relative motion is produced under the assumption of a linear relative motion between the image sensor and the code.

14. The method in accordance with claim 1,
    wherein the presence of a code in the reading zone is recognized with reference to the time behavior of the events generated by the image sensor.

15. The method in accordance with claim 1,
    wherein codes are read having a module width smaller than the pixel size of the pixel element.

16. The method in accordance with claim 1,
    wherein the image sensor is effectively slanted with respect to a plane of the code.

17. The method in accordance with claim 1,
wherein image information of the reading zone is additionally detected using a non-event based image sensor.

18. The method in accordance with claim 17,
wherein at least one of a trigger point in time and a parameter for the non-event based image sensor is determined from the image information of the event-based image sensor.

19. A method of reading optical codes in which an image sensor having at least one pixel element detects image information in a reading zone and in which the image information is evaluated to read a code in the reading zone,
wherein the image sensor is an event-based image sensor whose pixel elements individually check whether their detected intensity changes a detected change in intensity by a pixel element beyond a threshold for a change of the intensity being an event, with image information only output by or read from the pixel element on an event,
and wherein the data stream is converted by filling with zeroes into a matrix whose basis is formed by the arrangement of the pixel elements on the image sensor and by the time.

20. A code reader having an event-based image sensor provided as an event-based camera having at least one pixel element for detecting image information in a reading zone and having an evaluation unit in which a method of reading optical codes is implemented, said method of reading optical codes comprising the steps of:

detecting image information in the reading zone by said event-based image sensor whose pixel elements determine when the intensity detected by the pixel element changes, responsive to the pixel element changes to provide image information, wherein the pixel element determines when the intensity detected by the pixel element changes and delivers image information at the exact time when the pixel element changes, and wherein the pixel element delivers differential information on whether the intensity has decreased or increased as the image information; and evaluating the image information to read a barcode or 2D code in the reading zone.

* * * * *